3,342,821
N,N'-BIS(HYDROCARBYLSULFINYL) PIPERAZINES

Rector P. Louthan, Bartlesville, Okla., assignor to Phillips Petroleum Company, a corporation of Delaware
No Drawing. Filed June 21, 1965, Ser. No. 465,713
6 Claims. (Cl. 260—268)

ABSTRACT OF THE DISCLOSURE

This invention relates to novel sulfinamides represented by the formula

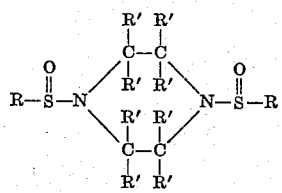

wherein each R' is selected from the group consisting of hydrogen, alkyl, cycloalkyl, aryl, aralkyl, alkaryl radicals containing from 1 to 10 carbon atoms, inclusive, and wherein the total number of carbon atoms in the sum of R' groups does not exceed 16, and wherein R is selected from the group consisting of alkyl, aryl, aralkyl and alkaryl radicals containing from 1 to 16 carbon atoms, inclusive.

---

This invention relates to novel sulfinamide compounds and a process for their preparation. In another aspect this invention relates to N,N'-bis(hydrocarbylsulfinyl) piperazines as new compounds and to their preparation. In another aspect this invention relates to the preparation of novel sulfinamides by the reaction of a piperazine with a sulfenyl halide and subsequently converting the thus formed N,N'-bis(hydrocarbylmercapto)piperazine to an N,N'-bis(hydrocarbylsulfinyl)piperazine.

It is thus an object of this invention to provide new sulfinamide compounds and a process for their production.

Thus, it is an object of this invention to provide novel sulfinamide compounds. Another object of this invention is to provide a novel process for this formation of sulfinamide compounds.

Other aspects, objects and the several advantages of this invention will be apparent from a study of the disclosure and the appended claims.

According to this invention, I have discovered that novel sulfinamide compounds are prepared by reaction of a piperazine with a sulfenyl halide and converting the thus formed N,N'-bis(hydrocarbylmercapto)piperazine to an N,N'-bis(hydrocarbylsulfinyl)piperazine by contact with hydrogen peroxide.

The products of the process of this invention are represented by the following formula

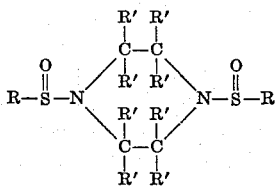

wherein R and R' have the scope as hereinafter described. Some specific examples of the compounds of the above formula which result from the process of this invention are: N,N'-bis(methylsulfinyl)piperazine, N,N'-bis(n-butylsulfinyl)-2-cyclohexylpiperazine, N,N'-bis(tert-octylsulfinyl)piperazine, N,N'-bis(n-hexadecylsulfinyl)2-n-decylpiperazine, N,N'-bis(phenylsulfinlyl)-2,3-diphenylpiperazine, and the like.

The preferred species of product of this invention are those wherein each R is a tert-alkyl group containing from 4 to 10 carbon atoms.

The N,N'-bis(hydrocarbylsulfinyl)piperazines of this invention are useful for a variety of purposes. These compounds are particularly useful as pest control agents such as repellents for birds and, in addition, serve as intermediates for the preparation of other chemical compounds.

The sulfenyl halides are represented by the formula RSX wherein X is selected from the group consisting of chlorine and bromine, and R is selected from the group consisting of alkyl, aryl, aralkyl, and alkaryl radicals containing from 1 to 16 carbon atoms, inclusive. Some examples of sulfenyl halides of the formula RSX which can be employed in the process of this invention are methylsulfenyl chloride, ethylsulfenyl bromide, n-butylsulfenyl chloride, tert-butylsulfenyl bromide, n-hexylsulfenyl chloride, tert-octylsulfenyl bromide, sec-dodecylsulfenyl chloride, n-hexadecylsulfenyl chloride, phenylsulfenyl bromide, benzylsulfenyl chloride, 4-phenylbutylsulfenyl chloride, 8-phenyloctylsulfenyl bromide, 2-naphthylsulfenyl chloride, 8-n-hexylnaphthylsulfenyl bromide, p-tolylsulfenyl bromide, and the like.

One method which can be employed for the preparation of these sulfenyl halides is the chlorination of the corresponding mercaptan or disulfide at temperatures generally ranging from about 0 to about 100° C. Such chlorination can be carried out in the presence or absence of an inert diluent such as a low molecular weight hydrocarbon. For example, excellent yields of tert-octylsulfenyl chloride are obtained by contacting tert-octyl mercaptan in solution in n-pentane with elemental chlorine. The mole ratio of halogen to mercaptan will generally be about 1:1, and the addition of halogen will be accomplished at a rate such that the heat of reaction can be removed from the reaction mixture. That is, the halogen must not be added at a rate greater than that at which the heat can be removed and at the same time keep the temperature of the reaction mass below the desired maximum. Also, the rate will usually not exceed a rate such that the halogen passes through the mixture without reaction occurring. Generally, this rate will be in the range of from about 1 to about 25 moles of halogen per mole of mercaptan per hour.

The piperazines which are reacted with the RSX reactant can be represented by the formula

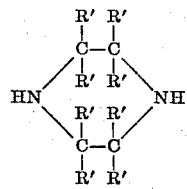

wherein each R' is selected from the group consisting of hydrogen, alkyl, cycloalkyl, aryl, aralkyl, alkaryl radicals containing from 1 to 10 carton atoms, inclusive, and wherein the total number of carbon atoms in the sum of R' groups does not exceed 16.

Some examples of piperazines which can be employed as reactants in the process of this invention are: piperazine, 2-methylpiperazine, 2,3-diethylpiperazine, 2,6-di-n-butylpiperazine, 2-phenylpiperazine, 2-cyclohexylpiperazine, 2,3-diphenylpiperazine, 2,5-di-n-octylpiperazine, 2-n-decylpiperazine, 2-benzylpiperazine, 2-p-tolylpiperazine, 2-(4-n-butylphenyl)piperazine, and the like.

The following specific example is intended to illustrate the advantages of the process of this invention but it is not intended that the invention be limited to the specific features shown therein.

Example

A run was carried out in which N,N'-bis(tert-octylsulfinyl)piperazine was prepared according to the process of this invention.

In this run, a solution formed from 2000 cc. of n-pentane and 307 grams of tert-octyl mercaptan was charged to a reactor and chlorinated by contacting 142 grams of chlorine with the solution. After chlorination was completed, the thus prepared tert-octylsulfenyl chloride was reacted with piperazine by adding the sulfenyl chloride solution to a solution comprising 86 grams of piperazine, 100 cc. of water, and 200 grams of 40 percent aqueous sodium hydroxide. After mixing the two solutions, 500 cc. of methanol was added. The resulting mixture was separated into two phases and the n-pentane phase was separated. The n-pentane phase was cooled to about −30° C., causing white crystals to separate out. After drying, 168 grams of crystalline material, melting point 95–100° C. was obtained. This product was N,N'-(tert-octylmercapto)piperazine.

The above prepared compound was converted to N,N'-bis(tert-octylsulfinyl)piperazine in the following manner. One hundred grams of the above prepared product and 160 cc. of methanol were charged to a reaction flask and heated to reflux. Since only a little of the sulfenamide went into solution, an additional 100 cc. of methanol was added to the mixture. At this time 60.4 grams of 30 percent aqueous hydrogen peroxide was added dropwise. About 50 cc. of isopropanol was added to the mixture and methanol was gradually boiled out of the reaction solution. The methanol was gradually replaced by 50 cc. isopropanol. The solution finally became a single phase after about 4 hours and gave a negative test for hydrogen peroxide. The product was recovered by diluting the reaction mixture with water and filtering out the solid product which precipitated. 84.4 grams of material melting point 132–136° C. was obtained. This material was N,N'-bis(tert-octylsulfinyl)piperazine.

Reasonable variations and modifications of this invention can be made, or followed, in view of the foregoing, without departing from the spirit or scope thereof.

I claim:
1. A compound selected from the group represented by the formula

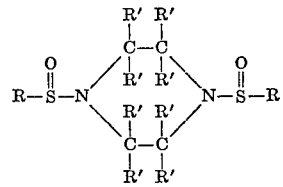

wherein R is selected from the group consisting of methyl, ethyl, n-butyl, tert-butyl, n-hexyl, tert-octyl, sec-dodecyl, n-hexadecyl, phenyl, benzyl, phenylbutyl, phenyloctyl, naphthyl, n-hexylnaphthyl, and p-tolyl, and R' is selected from the group consisting of hydrogen, methyl, ethyl, n-butyl, phenyl, cyclohexyl, n-octyl, n-decyl, benzyl, p-tolyl, and n-butylphenyl.

2. N,N'-bis(tert-octylsulfinyl)piperazine.
3. N,N'-bis(methylsulfinyl)piperazine.
4. N,N'-bis(n-butylsulfinyl)2-cyclohexylpiperazine.
5. N.N' - bis(n - hexadecylsulfinyl)2 - n - decylpiperazine.
6. N,N'-bis(phenylsulfinyl)-2,3-diplenylpiperazine.

References Cited
UNITED STATES PATENTS
2,946,715   7/1960   Stansbury et al. _____ 260—551

HENRY R. JILES, *Primary Examiner.*

ALEX MAZEL, *Examiner.*

R. BOYD, *Assistant Examiner.*